J. JENKS,

Assignor of one-half interest to G. A. JENKS.

Feeding Air to Furnaces.

No. 8,203. Reissued April 30, 1878.

Witness:
H. L. Aulls
Charles J. Hunt

Inventor:
J. Jenks
By Atty
Robt S. Sprague

N. PETERS, PHOTO-LITHOGRAPHER, WASHINGTON, D. C.

UNITED STATES PATENT OFFICE.

JAMES JENKS, OF DETROIT, MICHIGAN, ASSIGNOR OF ONE-HALF INTEREST TO GEORGE A. JENKS.

IMPROVEMENT IN FEEDING AIR TO FURNACES.

Specification forming part of Letters Patent No. 188,913, dated March 27, 1877; Reissue No. 8,203, dated April 30, 1878; application filed February 7, 1878.

*To all whom it may concern:*

Be it known that I, JAMES JENKS, of Detroit, in the county of Wayne and State of Michigan, have invented an Improvement in Boiler-Furnaces, of which the following is a specification:

The nature of my invention relates to certain new and useful improvements in the construction of boiler-furnaces, by means of which the gases evolved from the burning fuel in the combustion-chamber are mingled with a fresh supply of heated air admitted thereto at points above the fuel, and supplying the necessary oxygen to produce perfect combustion of such gases at the points where the heat thus produced will be utilized with great economy and effect upon the boiler.

In a large proportion of the boiler-furnaces in use in the manufacturing districts of the country mineral coals are employed as fuel, and these coals, in the progress of combustion, throw off a large volume of gas, which is not consumed unless some provision is made other than the usual draft-supply through the ash-pit for supplying them with the necessary oxygen.

When such provision is made, the air admitted should be heated and thoroughly mixed with the gases, so that when brought into contact with flame they will be ignited and consumed.

To accomplish this is the object of my invention, which consists in the construction, combination, and arrangement of the various parts for effecting the end sought, as more fully hereinafter explained.

Figure 1:
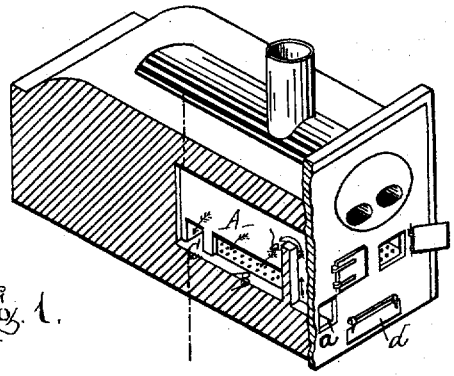
Figure 2:
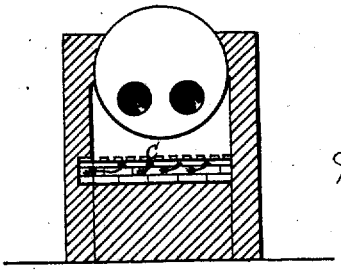

Figure 1 is a perspective view of a boiler-furnace, with a portion of the wall broken away to show the flue in the side of the combustion-chamber. Fig. 2 is a vertical cross-section through the hollow bridge-wall.

Like letters indicate like parts in each figure.

In the drawings, A represents a flue built into the wall of the combustion-chamber, and connecting with an opening, *a*, through the front or side to the outer air, and which should be supplied with a suitable valve or stopper. It (this opening) may be connected with a blower, if it is desired to force the blast at any time.

A flue-strip, *b*, may be inserted in rear of the opening *a*, as shown, which will guide the air entering to the upper part of the flue A, where it will be heated to a high degree by contact with the heated wall of the combustion-chamber.

The area of the opening for the admission of the air is larger than the perforations in the plates B, which are inserted into the side walls of the combustion-chamber above the fuel in said chamber. Consequently a larger volume of air is admitted than can pass through these perforations, and the excess will pass through the flue into the hollow bridge-wall C, the top of which is perforated, as shown in Fig. 2.

The air admitted through the perforated sides of the combustion-chamber mingles with and furnishes the necessary supply of oxygen in a highly-heated condition for the consumption of the gases evolved from the burning fuel near the sides of the combustion-chamber. These gases evolved near the center of the fire, in passing toward the outlet, pass over the bridge-wall, where they mingle with the heated air entering through the top of said bridge-wall by means of the aforesaid perforations therein, and are consumed, thereby saving a large amount of fuel over furnaces constructed in the ordinary manner.

As the combustion in a boiler-furnace is designed to be rapid as compared to that of an ordinary heating-stove, a proportionately larger amount of air is admitted through the ash-pit and grate-bars as usually arranged. This amount of air, being largely in excess of that required for the preliminary combustion of the fuel as boiler-furnaces are usually constructed, passes through the fire, and escapes at the outlet with a very large proportion of its oxygen not utilized, and, to a certain degree, converted into carbonic-acid gas, which will not assist in the burning of the gases Consequently I prefer to use a perforated grate, as shown, and a closed ash-pit provided with a suitable valve or door, *d*, by means of which only a sufficient amount of air will be admitted through the grate to afford the necessary oxygen to ignite the coal and keep up a good preliminary combustion on the grate. Then the gases evolved from such combustion, being mingled with a fresh supply of heated air in the manner I have above described, will be thoroughly and effectually consumed, emitting great heat, with a correspondingly good effect.

I do not desire to confine myself to a closed ash-pit and perforated grate, as my invention is applicable to furnaces provided with the open ash-pit or any other style of grate.

What I claim as my invention, and desire to secure by Letters Patent, is—

1. In a boiler-furnace, a flue in the wall thereof provided with a flue-strip in rear of the opening to the outer air, in combination with the imperforated upper part and perforated lower part of said flue, substantially as and for the purposes set forth.

2. In a boiler-furnace, the combination of the flue A, provided with opening *a* and flue-strip *b*, with the perforated side of the furnace-wall and the perforated bridge-wall, constructed and arranged to operate substantially as described and shown.

JAMES JENKS.

Witnesses:
H. S. SPRAGUE,
CHAS. J. HUNT.